Nov. 25, 1952  D. W. HOSMER  2,619,432
CERAMIC-TO-METAL BONDING
Filed Jan. 15, 1949

INVENTOR
DOUGLAS W. HOSMER
BY
ATTORNEY

Patented Nov. 25, 1952

2,619,432

UNITED STATES PATENT OFFICE 2,619,432

CERAMIC-TO-METAL BONDING

Douglas W. Hosmer, Newton Center, Mass., assignor to Raytheon Manufacturing Company, Newton, Mass., a corporation of Delaware Application January 15, 1949, Serial No. 71,129

2 Claims. (Cl. 117—71)

This application relates to the bonding of ceramics to metals and more particularly to methods and means whereby such bonding may be accomplished.

In prior methods of bonding metals to ceramics, the ceramics used were subject to thermal shock, such that rapid changes in their temperature caused deterioration by crumbling and cracking.

Therefore, it is an object of this invention to provide a ceramic to metal bond which may be rapidly produced.

It is a further object of this invention to produce a ceramic to metal bond which will have a tensile strength comparable with that of the metal used.

It is still another object of this invention to produce a ceramic to metal bond to a ceramic which will withstand high thermal shock during use.

Other and further objects of this invention will become apparent as the description thereof progresses, with reference to the accompanying drawings wherein.

Figure 1:
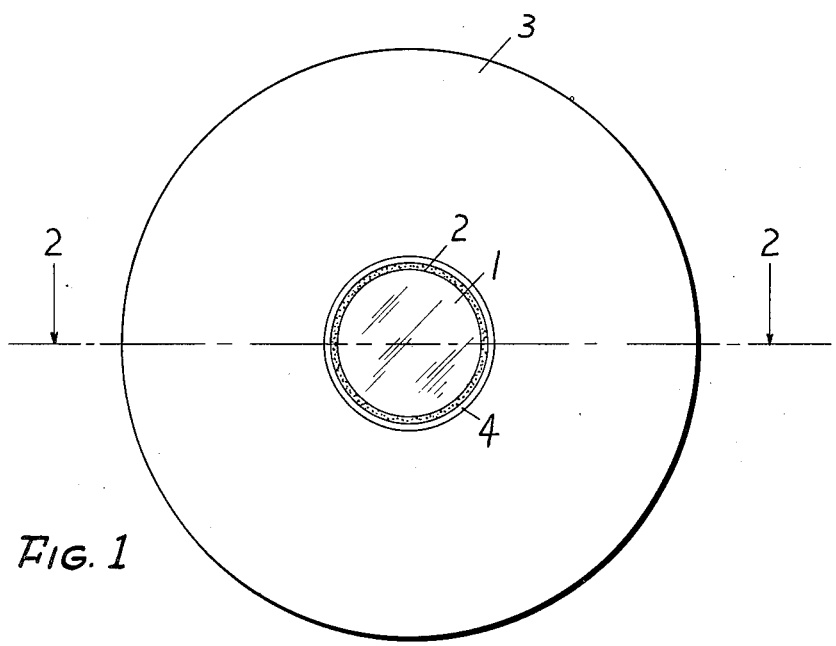
Fig. 1 shows a metal member having a ceramic member bonded thereto.
Figure 2:
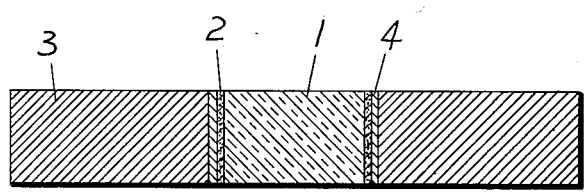
Fig. 2 is a cross-sectional view of the metal member, ceramic member, and bond taken along line 2—2 of Fig. 1.

Referring now to Figs. 1 and 2 there is shown a ceramic member 1 which is made of zircon, or zirconium silicate ($ZrO_2SiO_2$), which has the feature of being able to withstand high thermal shocks such that it may be heated from room temperature to 1350° C. in less than fifteen minutes without cracking or in any way disintegrating. To this ceramic, which I have shown as a circular disk for purposes of illustration only, there is applied a coating 2 to the cylindrical edge thereof, which coating may be made in the following manner.

A mixture of 70% molybdenum and 30% iron is held together by a binder which may be, for example, a solution of nitrocellulose in amyl acetate. The iron and molybdenum are in the form of finely-divided particles, approximately 3 microns in size, which are held in suspension in the solution. The mixture of molybdenum, iron and binder is applied to the surface to be coated, for example, by spraying the mixture thereon. The surface is then heated to 1350° C. whereupon the binder is completely evaporated leaving the coating of molybdenum and iron firmly adhering to the ceramic surface.

A mixture of finely divided nickel particles, for example, 3 microns in size, is then suspended in the same binder solution described above, and sprayed on the surface over the coating of molybdenum and iron. The surface is then heated to 1000° C. completely evaporating the binder and leaving a firm coating of nickel adhering to the coating of iron and molybdenum.

To this coating may then be soldered any desired metal member, for example, the member 3. This member 3 may be, for example, copper and has therein a hole conforming to the size of the disk 1 but slightly larger than the disk 1. The member 3 is placed around the disk. Solder is then inserted in the space between the disk and the metal member 3. This solder may be of any desired type such as standard lead-tin solder mixtures, silver solder mixtures, or gold-copper solder mixtures. The assembly is then placed in an oven and heated to above the melting point of the solder, whereupon the solder firmly adheres to the coating of nickel and to the member 3 such that upon cooling a firm bond is produced between the metal member 3 and the ceramic 1. The metal member 3, may, if desired, be brazed or welded to the metal coating, rather than soldered.

Due to the fact that the zirconium silicate may be rapidly heated and cooled, a bond may be produced between a ceramic and a metal in approximately three hours, while, with the ceramics now in use for bonding processes, a full day is required for each heating and cooling operation thus requiring as much as three days to produce a bond between a ceramic and metal.

Furthermore, since zirconium silicate has a high compressive strength (about 70,000 p. s. i.), and, since the process described herein produces an extremely strong bond, the ceramic and metal structure is substantially as strong as one made entirely of metal.

The coating 2 may also be made of titanium hydride which may be applied to the ceramic 1 by spraying or painting. Solder is then inserted between the coating of titanium hydride and the metal before the titanium hydride is heated. The entire assembly is then heated, whereupon the titanium hydride is reduced to titanium metal which adheres to the ceramic and alloys with the solder to form a firm bond upon cooling. This particular bond is desirable for producing gastight ceramic to metal points.

Where a coating of titanium hydride is used, however, it is preferable that the process must be carried out in a vacuum since the titanium metal formed by the titanium hydride will react with oxygen and nitrogen in the air forming compounds such as rutile whose presence substantially weakens the bond.

While the coatings described here and their method of application produce the best results, any mixture of metals could be used for the coating which would adhere to the ceramic, or any metal compounds could be used for the coating which would reduce, upon heating, to a metal which would bond to the ceramic and the solder.

The binder used to hold the divided metal particles that are sprayed onto the ceramic may be any of the standard commercial binders used today, which will evaporate leaving no residue.

The diversity of products which may be made by this type of bond is large. The one in the illustrated example could have a hole drilled in the ceramic and a lead-in wire bonded therein thus producing an insulating seal which may be used in an electronic tube. By this process zirconium silicate R. F. windows could be sealed into a wave guide to maintain a vacuum inside the wave guide and allow the passage of R. F. energy into and out of the wave guide.

In view of the foregoing diversity of applications and methods of producing the product, it is desired that a broad interpretation be given the appended claims commensurate with the scope of the invention within the art.

What is claimed is:

1. The method of coating zirconium silicate with metal, comprising the steps of applying a layer of a mixture of finely divided iron and molybdenum to the surface of said zirconium silicate, bonding said layer of iron and molybdenum to said surface by heating said surface to about 1350° centigrade, applying a layer of finely divided nickel to said surface, and bonding said layer of nickel to said surface by heating said surface to about 1000° centigrade.

2. In combination, a body of zirconium silicate, and a metallic coating bonded thereto by the method comprising the steps of applying a layer of a mixture of finely divided iron and molybdenum to the surface of said zirconium silicate, bonding said layer of iron and molybdenum to said surface by heating said surface to about 1350° centigrade, applying a layer of finely divided nickel to said surface, and bonding said layer of nickel to said surface by heating said surface to about a thousand degrees centigrade.

DOUGLAS W. HOSMER.

REFERENCES CITED

The following references are of record in the file of this patent:

UNITED STATES PATENTS

| Number | Name | Date |
|---|---|---|
| 2,119,989 | Higgins | June 7, 1938 |
| 2,163,407 | Pulfrich | June 20, 1939 |
| 2,336,366 | Mudge | Dec. 7, 1943 |
| 2,351,798 | Alexander | June 20, 1944 |
| 2,363,067 | Lait | Nov. 21, 1944 |
| 2,511,679 | Theiss | June 13, 1950 |

FOREIGN PATENTS

| Number | Country | Date |
|---|---|---|
| 396,532 | Great Britain | Aug. 10, 1933 |
| 492,394 | Great Britain | Sept. 20, 1938 |
| 594,752 | Great Britain | Nov. 18, 1947 |